United States Patent
Song et al.

(10) Patent No.: US 10,789,347 B1
(45) Date of Patent: Sep. 29, 2020

(54) IDENTIFICATION PREPROCESSING

(71) Applicant: Alibaba Group Holding Limited, George Town (KY)

(72) Inventors: Yitao Song, Hangzhou (CN); Mian Huang, Hangzhou (CN); Lei Zhou, Hangzhou (CN)

(73) Assignee: Alibaba Group Holding Limited, George Town, Grand Cayman (KY)

(*) Notice: Subject to any disclaimer, the term of this patent is extended or adjusted under 35 U.S.C. 154(b) by 0 days.

(21) Appl. No.: 16/809,856

(22) Filed: Mar. 5, 2020

Related U.S. Application Data (63) Continuation of application No. PCT/CN2020/071708, filed on Jan. 13, 2020.

(30) Foreign Application Priority Data

Jul. 18, 2019 (CN) .......................... 2019 1 0651275

(51) Int. Cl.
*G06F 21/32* (2013.01)
*H04W 4/021* (2018.01)
*H04L 29/06* (2006.01)

(52) U.S. Cl.
CPC .......... *G06F 21/32* (2013.01); *H04L 63/0861* (2013.01); *H04L 63/104* (2013.01); *H04W 4/021* (2013.01); *G06F 2221/2111* (2013.01)

(58) Field of Classification Search
None
See application file for complete search history.

(56) References Cited

U.S. PATENT DOCUMENTS

2014/0074605 A1* 3/2014 Sanchez ............. G06Q 30/0267 705/14.53
2017/0055032 A1* 2/2017 Oshima ............... H04L 65/4084

FOREIGN PATENT DOCUMENTS

| CN | 101640670 | 2/2010 |
| CN | 101682620 | 3/2010 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — William J. Goodchild
(74) *Attorney, Agent, or Firm* — Fish & Richardson P.C.

(57) ABSTRACT

This disclosure relates to identification preprocessing. In one aspect, a method includes receiving at an identification server, and from a mobile computing device that has entered a predetermined area surrounding a biometric feature collection device, a group identifier of a user group to which a user of the mobile computing device belongs. The group identifier is transmitted by the mobile computing device in response to the mobile computing device receiving a radio signal broadcast to the predetermined area. The user group is one of multiple user groups. Based on the group identifier, the identification server selects, from a stored registration biometric feature set, a registration biometric feature associated with each user in the user group. The identification server adds the registration biometric feature to a screening feature set established for the biometric feature collection device. Biometric feature-based identification is performed on the user using the screening feature set.

20 Claims, 6 Drawing Sheets

(56) References Cited

FOREIGN PATENT DOCUMENTS

| | | |
|---|---|---|
| CN | 101827309 | 9/2010 |
| CN | 101924750 | 12/2010 |
| CN | 106612259 | 5/2017 |
| CN | 107483416 | 12/2017 |
| CN | 109697404 | 4/2019 |
| CN | 109992680 | 7/2019 |
| CN | 110457882 | 11/2019 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2020/071708, dated Mar. 27, 2020, 14 pages (with partial machine translation).

\* cited by examiner

IDENTIFICATION PREPROCESSING

CROSS-REFERENCE TO RELATED APPLICATIONS

This application is a continuation of PCT Application No. PCT/CN2020/071708, filed on Jan. 13, 2020, which claims priority to Chinese Patent Application No. 201910651275.4, filed on Jul. 18, 2019, and each application is hereby incorporated by reference in its entirety.

TECHNICAL FIELD

Implementations of the present disclosure relate to the field of information technologies, and in particular, to identification preprocessing.

BACKGROUND

When registering an identity with an identification server, a user may also register a biometric feature (e.g., a face feature), such that the identification server associates the identity with the biometric feature, and subsequently identifies the user identity (i.e., identifying the user identity corresponding to the user) by collecting the biometric feature of the user again.

SUMMARY

To improve identification efficiency, implementations of the present specification provide identification preprocessing and identification methods and systems.

For convenience of description, in the present specification, the biometric feature registered by the user is referred to as a registration biometric feature, and the biometric feature collected subsequently is referred to as a collection biometric feature.

In practice, the identification server stores a registration biometric feature set including registration biometric features of different users. The process of identifying a user is as follows:

1. A to-be-identified user arrives at a biometric feature collection device for biometric feature collection (e.g., collecting a face feature).

2. The biometric feature collection device uploads a collection biometric feature collected to an identification server.

3. The identification server needs to compare the collection biometric feature with each registration biometric feature in a registration biometric feature set one by one. Once a registration biometric feature matching the collection biometric feature is found, an identity of the to-be-identified user can be determined.

However, the efficiency of current biometric feature-based identification is very low.

Technical Solutions are as Follows:

According to a first aspect of the implementations of the present specification, an identification preprocessing method is provided, where users are classified into several user groups including at least one user based on a predetermined rule, and a biometric feature collection device broadcasts a radio signal to a predetermined surrounding area of the biometric feature collection device; and the method includes the following: after entering the predetermined surrounding area, determining, by a user mobile device, a group identifier of a user group to which an owner user belongs based on the received radio signal, and providing the group identifier to an identification server; and determining, by the identification server, a registration biometric feature associated with each user in the user group corresponding to the group identifier from a stored registration biometric feature set, and adding the determined registration biometric feature to a screening feature set established for the biometric feature collection device, where the screening feature set is used to perform biometric feature-based identification on the owner user at the biometric feature collection device.

According to a second aspect of the implementations of the present specification, an identification method based on the first aspect is provided, and includes the following: collecting, by a biometric feature collection device, a biometric feature of a to-be-identified user as a collection biometric feature, and uploading the collection biometric feature to an identification server; and determining, by the identification server, whether a registration biometric feature matching the collection biometric feature exists in a screening feature set established for the biometric feature collection device; and if a matched registration biometric feature exists in the screening feature set, identifying an identity of the to-be-identified user as an identity associated with the matched registration biometric feature.

According to a third aspect of the implementations of the present specification, an identification preprocessing system is provided, and includes a biometric feature collection device and an identification server, where users are classified into several user groups including at least one user based on a predetermined rule; the biometric feature collection device broadcasts a radio signal to a predetermined surrounding area of the biometric feature collection device; and after entering the predetermined surrounding area, a user mobile device determines a group identifier of a user group to which an owner user belongs based on the received radio signal, and provides the group identifier to the identification server; and the identification server determines a registration biometric feature associated with each user in the user group corresponding to the group identifier from a stored registration biometric feature set, and adds the determined registration biometric feature to a screening feature set established for the biometric feature collection device, where the screening feature set is used to perform biometric feature-based identification on the owner user at the biometric feature collection device.

According to a fourth aspect of the implementations of the present specification, an identification system based on the first aspect is provided, and includes a biometric feature collection device and an identification server, where the biometric feature collection device collects a biometric feature of a to-be-identified user as a collection biometric feature, and uploads the collection biometric feature to the identification server; and the identification server determines whether a registration biometric feature matching the collection biometric feature exists in a screening feature set established for the biometric feature collection device; and if a matched registration biometric feature exists in the screening feature set, identifies an identity of the to-be-identified user as an identity associated with the matched registration biometric feature.

According to the technical solutions provided in the implementations of the present specification, after any user with a mobile device enters a predetermined surrounding area of a biometric feature collection device, the mobile device of the user receives a radio signal broadcast by the biometric feature collection device. The radio signal triggers the mobile device to provide a group identifier of a user group to which the owner user belongs to an identification server. The identification server determines a registration biometric feature associated with each user in the user group corresponding to the group identifier from a registration biometric feature set, and adds the determined registration biometric feature to a screening feature set. Subsequently, the identification server compares each registration biometric feature in the screening feature set with a collection biometric feature uploaded by the biometric feature collection device, to identify a user.

In the implementations of the present specification, a quantity of registration biometric features that need to be compared during user identification is reduced, so that identity authentication efficiency is improved.

It should be understood that the previous general description and the following detailed description are merely illustrative examples, and cannot limit the implementations of the present specification.

In addition, any one of the implementations of the present specification does not need to achieve each of the previous effects.

BRIEF DESCRIPTION OF DRAWINGS

To describe the technical solutions in the implementations of the present specification or in the existing technology more clearly, the following briefly describes the accompanying drawings needed for describing the implementations or the existing technology. Clearly, the accompanying drawings in the following description merely show some implementations of the present specification, and a person of ordinary skill in the art can still derive other drawings from these accompanying drawings.

DESCRIPTION OF IMPLEMENTATIONS

In practice, there are an enormous quantity of registration biometric features in a registration biometric feature set stored on an identification server. Assuming that 10 million users have registered with the identification server, a quantity of registration biometric features in the registration biometric feature set stored on the identification server is not less than 10 million.

If an existing identification method is used, the identification server sequentially compares a collection biometric feature of a user collected by a biometric feature collection device with each registration biometric feature in the registration biometric feature set. Therefore, a workload of the identification server is huge, it takes a relatively long time to perform identification, and identification efficiency is relatively low. Consequently, the user needs to wait for a long time for an identification result at the biometric feature collection device.

In addition, when many registration biometric features need to be compared, multiple registration biometric features that are sufficiently similar to each other may satisfy a matching requirement of the collection biometric feature, and the multiple registration biometric features that are sufficiently similar to each other belong to different user identities, which actually reduces identification accuracy.

In the implementations of the present specification, once a to-be-identified user enters a predetermined surrounding area of the biometric feature collection device, a mobile device of the to-be-identified user is triggered by a radio signal broadcast by the biometric feature collection device to perform an operation of providing a group identifier of a user group to which the owner user belongs to the identification server. Therefore, the identification server can reduce a quantity of registration biometric features that need to be compared based on the group identifier of the user group to which the to-be-identified user belongs before identifying the to-be-identified user (i.e., before the to-be-identified user arrives at a location of the biometric feature collection device for identification). As such, the user can wait for the identification for a shorter time at the biometric feature collection device, and also, identification accuracy can be improved.

In addition, it is worthwhile to note that in one or more implementations of this solution, once the user mobile device enters the predetermined surrounding area, an identity of the user is automatically provided to the identification server. Subsequently, when the user arrives at the biometric feature collection device, the user directly provides a biometric feature of the user to the biometric feature collection device. In other words, before the user enters the identification process, the identification server can obtain the identity of the user without awareness of the user, so as to narrow a comparison range of registration biometric features. After the user enters the identification process, only the biometric feature of the user needs to be provided, and no redundant operation is needed, which is relatively convenient for the user.

To make a person skilled in the art understand the technical solutions in the implementations of the present specification better, the following describes in detail the technical solutions in the implementations of the present specification with reference to the accompanying drawings in the implementations of the present specification. Clearly, the described implementations are merely some but not all of the implementations of the present specification. Other implementations obtained by a person of ordinary skill in the art based on the implementations of the present specification shall fall within the protection scope.

The technical solutions provided in the implementations of the present specification are described in detail below with reference to the accompanying drawings.

Figure 1:
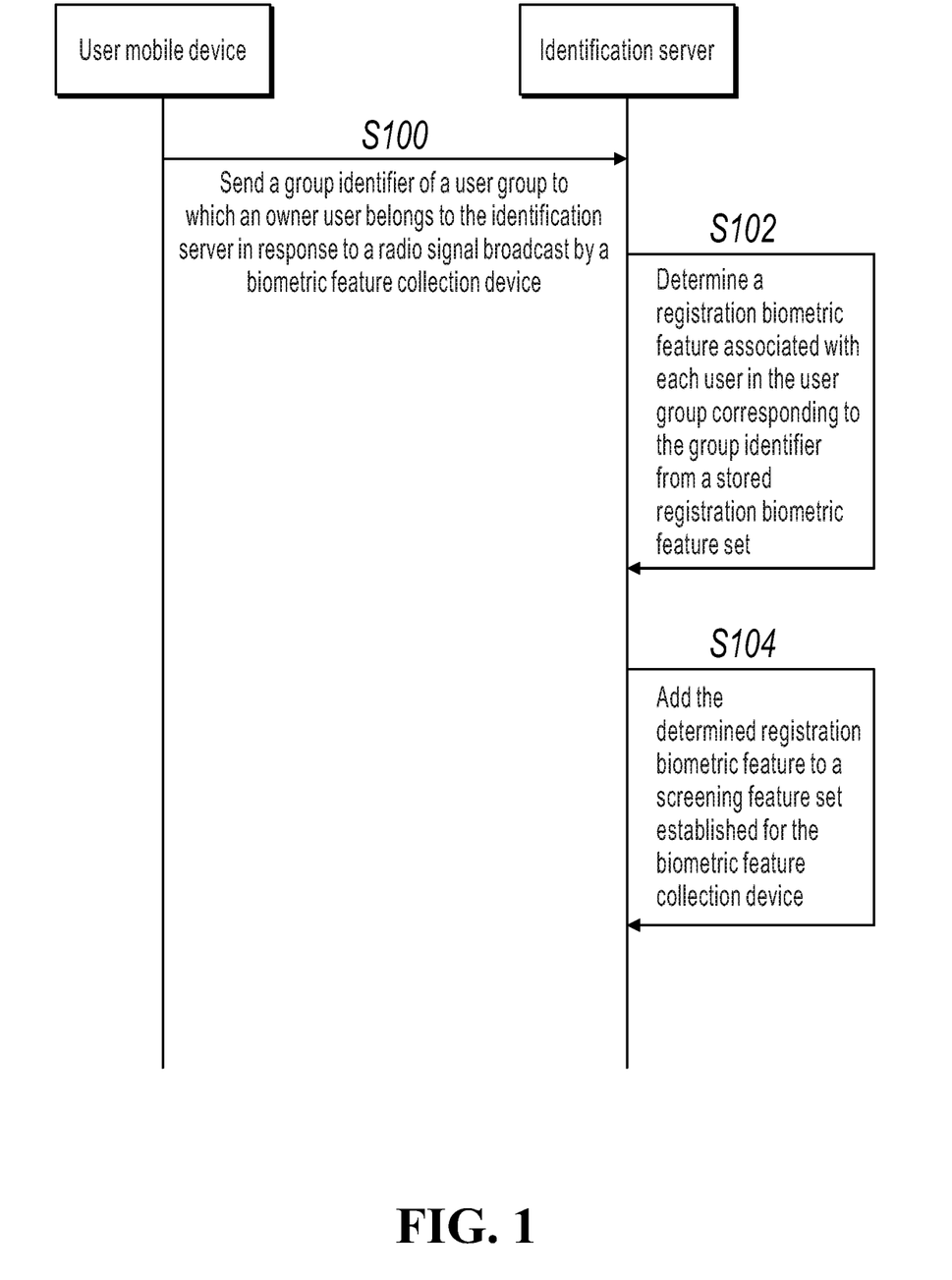
FIG. 1 is a schematic flowchart illustrating an identification preprocessing method, according to an implementation of the present specification.

FIG. 1 is a schematic flowchart illustrating an identification preprocessing method, according to an implementation of the present specification. The method includes the following steps:

S100: After entering a predetermined surrounding area, a user mobile device determines a group identifier of a user group to which an owner user belongs based on a received radio signal, and provides the group identifier to an identification server.

In this implementation of the present specification, the user mobile device is a mobile device carried by the user, for example, a mobile phone, a tablet, or a notebook carried by the user.

A biometric feature collection device is an intelligent device configured to collect a biometric feature of a user. The biometric feature collection device generally has a device identifier. The device identifier can be a physical address (MAC address) of the biometric feature collection device, or can be a universal unique identifier (UUID) of the biometric feature collection device.

Generally, a user needs to arrive at a location of the biometric feature collection device, to satisfy a requirement of the biometric feature collection device for biometric feature collection. For example, the user needs to arrive at the location of the biometric feature collection device, and faces a camera on the biometric feature collection device, so that the biometric feature collection device collects a face feature of the user. It is worthwhile to note that when the user arrives at the location of the biometric feature collection device, the user starts to enter an identification process.

In this implementation of the present specification, users are classified into several user groups based on a predetermined rule, and each user group includes at least one user.

The predetermined rule is a user classification policy, and can be specified based on actual needs. For example, each user can be classified under one user group. In this case, each user group includes only one user, and a group identifier of the user group is an identity of the user in the user group.

In practice, the identification server can classify users, and send a group identifier of a user group to which each user belongs to a mobile device of the user for storage.

In addition, the user mobile device may not obtain the group identifier corresponding to the owner user from the identification server, but calculate the group identifier of the user group to which the owner user belongs based on an identity-group identifier mapping algorithm pre-agreed between the user mobile device and the identification server.

Specifically, the identification server can classify users in the following way: The identification server determines a group identifier to which an identity of each user is mapped based on the identity of the user and the predetermined identity-group identifier mapping algorithm, and then classifies the user under a user group corresponding to the mapped group identifier.

Correspondingly, the user mobile device can determine the group identifier corresponding to the owner user in the following way: The user mobile device determines a group identifier to which an identity of the owner user is mapped based on the identity of the owner user and the predetermined identity-group identifier mapping algorithm, and uses the group identifier as the group identifier of the user group to which the owner user belongs.

Further, the identity-group identifier mapping algorithm can be agreed based on actual needs. For example, if an identity of a user is an identity card number or a unique number allocated by the identification server to the user, it can be agreed that the last four digits of the identity of the user is a group identifier of a user group to which the user belongs, or it can be agreed that a calculation result obtained after a modulo operation or a remainder operation is performed on the identity of the user and a specified value (e.g., 10000) is a group identifier of a user group to which the user belongs.

In this implementation of the present specification, the predetermined surrounding area is a predetermined area near the biometric feature collection device. For example, the predetermined surrounding area can be a circular area that is centered on the biometric feature collection device and has a specified distance as a radius. For another example, the predetermined surrounding area can be a rectangular area (5 m*5 m) in front of the biometric feature collection device, a distant boundary (a boundary that is relatively distant from the biometric feature collection device) of the rectangular area is 12 m away from the biometric feature collection device, and a close boundary (a boundary that is relatively close to the biometric feature collection device) of the rectangular area is 7 m away from the biometric feature collection device.

In practice, the predetermined surrounding area can be specified based on service needs. For example, if the identification server needs to obtain an identity of a user at least five seconds before the user enters an identification process, it can be determined through calculation that the close boundary of the predetermined surrounding area needs to be away from the biometric feature collection device by at least 2 m/s*5 s=10 m based on a step speed (e.g., 2 m/s) of a common user.

In this implementation of the present specification, the biometric feature collection device broadcasts the radio signal to the predetermined surrounding area of the biometric feature collection device. Therefore, it can be understood that the predetermined surrounding area falls within signal coverage of the biometric feature collection device. The radio signal broadcast by the biometric feature collection device can include a device identifier of the biometric feature collection device. Another device can identify a device type of the device broadcasting the radio signal based on the device identifier in the received radio signal, or establish a communication connection to the device broadcasting the radio signal based on the device identifier in the received radio signal.

The radio signal broadcast by the biometric feature collection device is used to trigger the user mobile device receiving the radio signal to perform the following predetermined operations: determining the group identifier of the user group to which the owner user belongs, and providing the group identifier to the identification server. It should be understood that code logic is usually built into the user mobile device, so that the user mobile device automatically performs the predetermined operations once the user mobile device receives the radio signal broadcast by the biometric feature collection device.

If a client program corresponding to the identification server is installed on the user mobile device, the code logic can be built into the client program. If a client program corresponding to the identification server is not installed on the user mobile device, the code logic can be built into firmware of the user mobile device.

In this implementation of the present specification, the identity of the owner user is usually an identity registered in advance by the owner user with the identification server, such as an account number, an identity card number, a mobile phone number, or a nickname.

In addition, it is worthwhile to note that, in practice, some users only pass through the predetermined surrounding area of the biometric feature collection device, but do not want to go to the biometric feature collection device for identification. Here, such a user is referred to as a to-be-unidentified user. In this case, if a mobile device of the to-be-unidentified user automatically uploads an identity of the to-be-unidentified user to the identification server, the identification server can know a trace of the to-be-unidentified user (near the biometric feature collection device), thereby causing disclosure of privacy of the to-be-unidentified user.

Therefore, in this implementation of the present specification, a quantity of users in each user group may need to be greater than 1. Once a user mobile device enters the predetermined surrounding area of the biometric feature collection device, the user mobile device can provide a group identifier (not an identity) corresponding to an owner user to the identification server, so as to obscure the user identity. As such, the identification server cannot determine an identity of a to-be-unidentified user near the current biometric feature collection device, thereby protecting trace privacy of the to-be-unidentified user passing through the predetermined surrounding area of the biometric feature collection device.

S102: The identification server determines a registration biometric feature associated with each user in the user group corresponding to the group identifier from a stored registration biometric feature set.

S104: Add the determined registration biometric feature to a screening feature set established for the biometric feature collection device.

It is worthwhile to note that a registration biometric feature associated with the identity is a biometric feature that is provided by a user corresponding to the identity to the identification server during registration.

Steps S102 and S104 are actually screening based on the whole registration biometric feature set, to pre-select a registration biometric feature associated with a user who is about to enter an identification process.

In practice, the biometric feature collection device usually collects a biometric feature for one user at a time, and cooperates with the identification server to identify the user. There are often multiple users entering the predetermined surrounding area of the biometric feature collection device. In this case, there are multiple registration biometric features selected by the identification server and added to the screening feature set.

However, there is an order of magnitude difference between a quantity of registration biometric features in the screening feature set (usually at the order of magnitude of 10 or 100) and a quantity of registration biometric features in the whole registration biometric feature set (usually at the order of magnitude of 10 or 100 million), which significantly reduces a quantity of registration biometric features that need to be compared during identification.

Further, in this implementation of the present specification, to further reduce the quantity of registration biometric features in the screening feature set, the identification server can delete the determined registration biometric feature from the screening feature set after specified duration elapses from a time when the determined registration biometric feature is added to the screening feature set.

In practice, some users may enter the predetermined surrounding area and then leave, and no identification is needed. Therefore, a validity period (the specified duration) is set, so that registration biometric features that expire are periodically cleared from the screening feature set.

Further, the identification server can reduce the quantity of registration biometric features that need to be compared, in other words, determine a registration biometric feature satisfying a specified condition from the determined registration biometric feature, and add the registration biometric feature satisfying the specified condition to the screening feature set established for the biometric feature collection device. The specified condition is that a registration activity area of a user associated with the registration biometric feature is in a location area in which the biometric feature collection device is located.

As such, in practice, a registration biometric feature associated with a user who is not frequently active near the biometric feature collection device is not added to the screening feature set corresponding to the biometric feature collection device.

In addition, several situations where the predetermined operations are performed on the user mobile device are discussed separately.

Situation 1

Only one biometric feature collection device is interconnected to the identification server, and the client program corresponding to the identification server is installed on the user mobile device. After receiving the radio signal broadcast by the biometric feature collection device, the user mobile device can invoke the installed client program in response to the received radio signal. Then, the user mobile device can determine the group identifier of the user group to which the owner user belongs by using the installed client program, and upload the group identifier to the identification server.

For an implementation solution corresponding to situation 1, references can be made to FIG. 1.

Situation 2

More than one biometric feature collection device is interconnected to the identification server, and the client program corresponding to the identification server is installed on the user mobile device.

In this case, the identification server needs to determine a biometric feature collection device that a location of the user mobile device currently sending the group identifier is near, so that the determined registration biometric feature is added to a screening feature set corresponding to the biometric feature collection device near the user mobile device sending the group identifier in step S104. Specifically, the user mobile device invokes the installed client program in response to the received radio signal, extracts a device identifier of the biometric feature collection device from the received radio signal by using the client program, determines the group identifier of the user group to which the owner user belongs by using the client program, and uploads the group identifier and the device identifier to the identification server.

Figure 2:
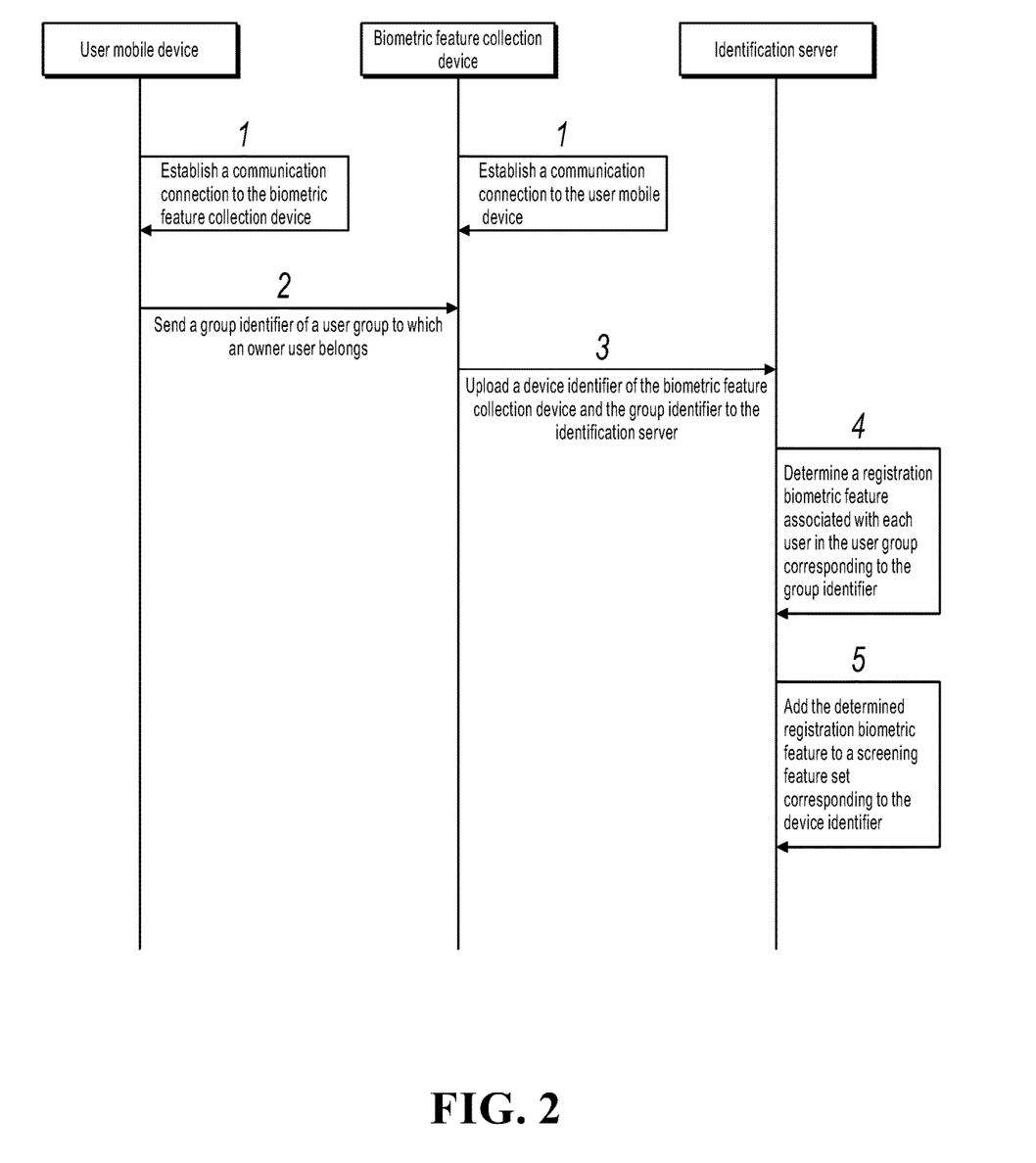
FIG. 2 is a schematic flowchart illustrating another identification preprocessing method, according to an implementation of the present specification.

Situation 3 (Refer to FIG. 2)

The user mobile device extracts the device identifier of the biometric feature collection device from the received radio signal, establishes the communication connection to the biometric feature collection device based on the device identifier, and then sends the group identifier of the user group to which the owner user belongs to the biometric feature collection device by using the communication connection. Then, the biometric feature collection device uploads the identity to the identification server. If the identification server corresponds to more than one biometric feature collection device, the biometric feature collection device not only needs to upload the identity to the identification server, but also needs to upload a device identity of the biometric feature collection device to the identification server, so that the identification server determines to subsequently add the selected registration biometric feature to a screening feature set corresponding to the device identifier.

Specifically, the radio signal broadcast by the biometric feature collection device to the predetermined surrounding area can be a Bluetooth beacon signal, or can be a Wi-Fi Aware signal.

If the user mobile device receives the Bluetooth beacon signal or the Wi-Fi Aware signal, the user mobile device can obtain the device identifier of the biometric feature collection device, and establish the communication connection to the biometric feature collection device based on the device identifier.

Specifically, after obtaining the device identifier, the user mobile device can establish a Bluetooth connection to the biometric feature collection device, or can establish a Wi-Fi direct connection to the biometric feature collection device.

It is worthwhile to note that when the biometric feature collection device broadcasts a Bluetooth beacon signal to the predetermined surrounding area, the user mobile device can establish a Bluetooth connection or a Wi-Fi direct connection to the biometric feature collection device. When the biometric feature collection device broadcasts a Wi-Fi Aware signal to the predetermined surrounding area, the user mobile device can establish a Bluetooth connection or a Wi-Fi direct connection to the biometric feature collection device.

Further, when the user mobile device needs to establish the communication connection to the biometric feature collection device, the user mobile device can determine the device type corresponding to the device identifier based on the device identifier. If the user mobile device determines that the device type corresponding to the device identifier is a device collecting a biometric feature, the user mobile device establishes the communication connection to the biometric feature collection device based on the device identifier. As such, the following situations can be reduced: The user mobile device automatically establishes a communication connection to a device other than the biometric feature collection device nearby, which affects solution implementation.

It is worthwhile to note that the client program corresponding to the identification server can be installed on the user mobile device, and the identity registered by the user with the identification server is logged in to the client program. In addition, when the client program is not installed, the user mobile device can also store the identity registered by the user with the identification server.

In this implementation of the present specification, if multiple biometric feature collection devices are interconnected to the identification server, the identification server actually manages screening feature sets corresponding to the multiple biometric feature collection devices. For any biometric feature collection device, the identification server compares a registration biometric feature in a screening feature set corresponding to the biometric feature collection device with a biometric feature of a to-be-identified user collected at the biometric feature collection device.

In other words, for any biometric feature collection device, if a registration face feature of a user who requests identification at the biometric feature collection device is not in a screening feature set corresponding to the biometric feature collection device, it means that the user cannot be identified, and the user has no rights to perform service operations such as account login and account payment.

Therefore, in practice, the identification server can use this mechanism to implement user-specific right control, user-specific personalized information push, etc. at the biometric feature collection device.

For example, the identification server can establish a user blacklist for each biometric feature collection device, and add a user who violates a rule at the biometric feature collection device to the user blacklist corresponding to the biometric feature collection device. As such, after receiving an identity of an owner user and a device identity that are sent by the user mobile device, if it is found that the user corresponding to the identity is in a user blacklist corresponding to the device identifier, a registration biometric feature of the user is not added to a screening feature set corresponding to the device identity, and further, the user fails to be identified and has no rights to perform a subsequent service operation.

For another example, when a user enters the predetermined surrounding area of the biometric feature collection device, a user mobile device automatically provides an identity of the user and the device identifier of the biometric feature collection device to the identification server, and the identification server not only adds a registration biometric feature of the user to the screening feature set corresponding to the device identity, but also determines personalized information (e.g., an advertisement or a coupon) to be pushed to the user based on the location of the biometric feature collection device (e.g., in a shopping mall or a brand store). If the user is successfully identified at the feature collection device, the identification server sends the personalized information to be pushed to the user to the biometric feature collection device, and the biometric feature collection device displays the personalized information to the user.

Figure 3:
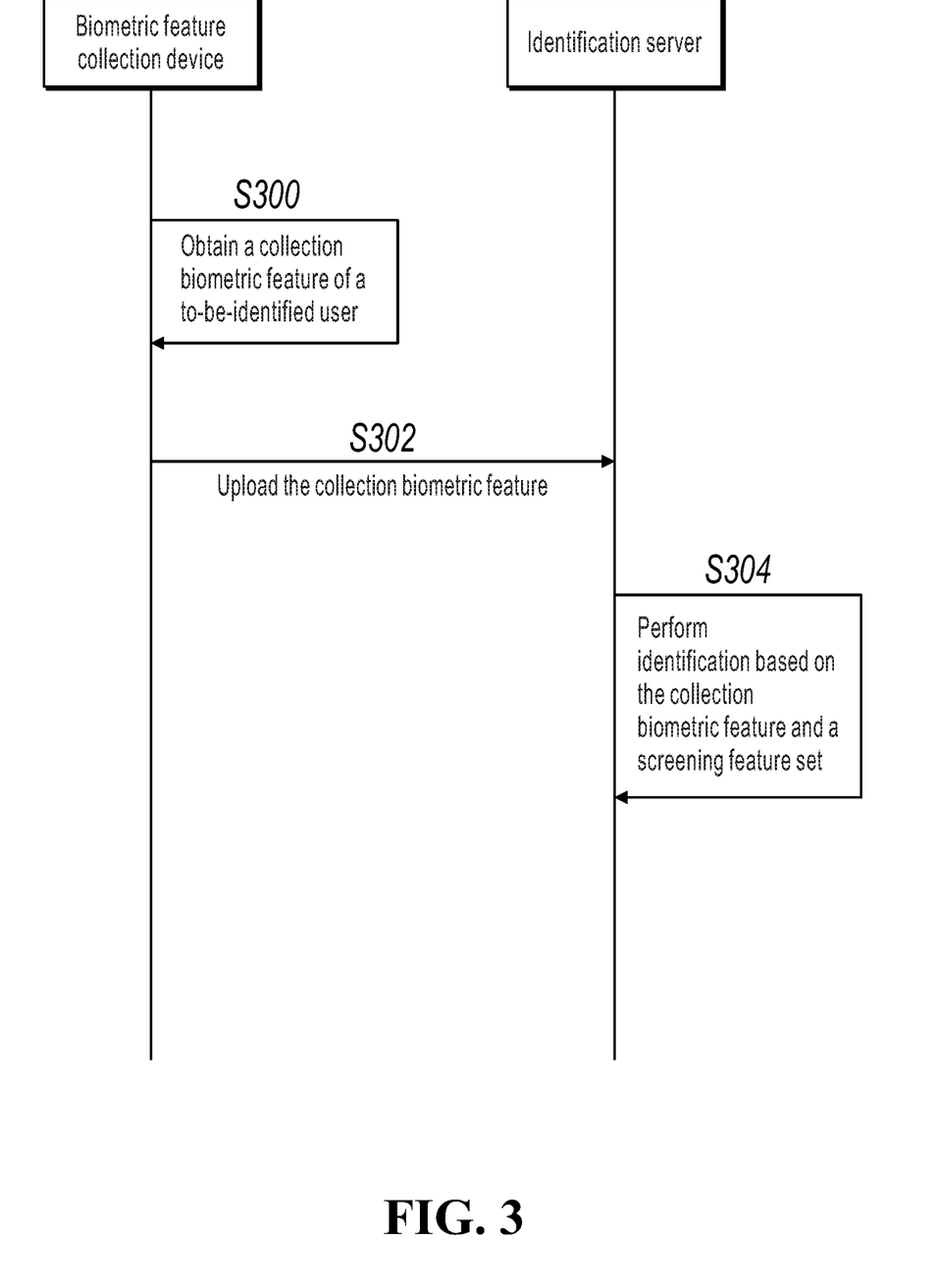
FIG. 3 is a schematic flowchart illustrating an identification method, according to an implementation of the present specification.

FIG. 3 is a schematic flowchart illustrating an identification method, according to an implementation of the present specification. The method includes the following steps.

S300: A biometric feature collection device collects a biometric feature of a to-be-identified user as a collection biometric feature.

S302: Upload the collection biometric feature to an identification server.

S304: The identification server determines whether a registration biometric feature matching the collection biometric feature exists in a screening feature set established for the biometric feature collection device; and if a matched registration biometric feature exists in the screening feature set, identifies an identity of the to-be-identified user as an identity associated with the matched registration biometric feature.

The identification preprocessing method shown in FIG. 1 and the identification method shown in FIG. 3 are two independent processes. For the same user, the identification preprocessing method shown in FIG. 1 needs to be performed first, and then the identification method shown in FIG. 3 is performed.

For any user, in the identification preprocessing method shown in FIG. 1, the user does not need to perform any operation from the time when the user enters a predetermined surrounding area of the biometric feature collection device to the time when the user arrives at the biometric feature collection device. In other words, the user can be unaware of the identification preprocessing method shown in FIG. 1.

In the implementation of the method shown in FIG. 3, when obtaining the collection biometric feature of the to-be-identified user currently at the biometric feature collection device, the identification server first performs biometric feature comparison by using the screening feature set determined by using the preprocessing method in FIG. 1. If a matched registration biometric feature exists in the screening feature set, the identity of the to-be-identified user can be determined.

If no matched registration biometric feature exists in the screening feature set, it does not necessarily indicate that the to-be-identified user is not registered, and instead, the identification server may not previously receive the identity provided by a mobile device of the to-be-identified user for a certain reason (e.g., no Bluetooth connection is successfully established between the user mobile device and the biometric feature collection device).

Further, if no matched registration biometric feature exists in the screening feature set, the identification server can determine whether a registration biometric feature matching the collection biometric feature exists in a stored registration biometric feature set. If a registration biometric feature matching the collection biometric feature exists in the registration biometric feature set, the identification server identifies the identity of the to-be-identified user as an identity associated with the matched registration biometric feature; or if no registration biometric feature matching the collection biometric feature exists in the registration biometric feature set, the identification server determines that the identification fails.

In addition, the identification server can delete the matched registration biometric feature from the screening feature set after identifying the identity of the to-be-identified user as the identity associated with the matched registration biometric feature.

In addition, it is worthwhile to further note that if multiple biometric feature collection devices are interconnected to the identification server, in step S302, the biometric feature collection device further needs to upload a device identifier of the biometric feature collection device to the identification server. As such, the following situation can be ensured: If the identification server receives a collection biometric feature uploaded by biometric feature collection device A, the identification server can determine to use a registration biometric feature subset corresponding to biometric feature collection device A to perform biometric feature comparison.

Figure 4:
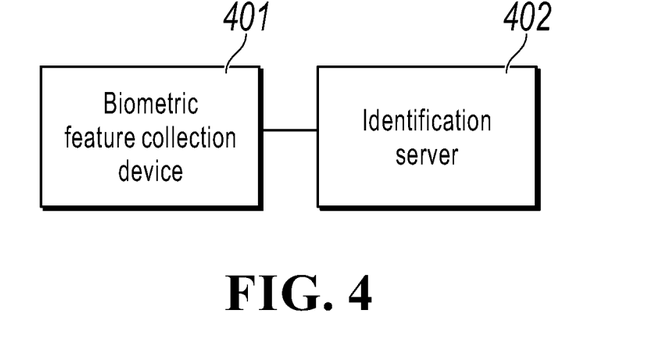
FIG. 4 is a system architecture diagram, according to an implementation of the present specification.

FIG. 4 is a system architecture diagram, according to an implementation of the present specification. The system includes a biometric feature collection device 401 and an identification server 402. The system architecture diagram can be specifically implemented by at least one of an identification preprocessing system and an identification system.

An identification preprocessing system includes a biometric feature collection device and an identification server, where users are classified into several user groups including at least one user based on a predetermined rule; the biometric feature collection device broadcasts a radio signal to a predetermined surrounding area of the biometric feature collection device; and after entering the predetermined surrounding area, a user mobile device determines a group identifier of a user group to which an owner user belongs based on the received radio signal, and provides the group identifier to the identification server; and the identification server determines a registration biometric feature associated with each user in the user group corresponding to the group identifier from a stored registration biometric feature set, and adds the determined registration biometric feature to a screening feature set established for the biometric feature collection device, where the screening feature set is used to perform biometric feature-based identification on the owner user at the biometric feature collection device.

An identification system includes a biometric feature collection device and an identification server, where the biometric feature collection device collects a biometric feature of a to-be-identified user as a collection biometric feature, and uploads the collection biometric feature to the identification server; and the identification server determines whether a registration biometric feature matching the collection biometric feature exists in a screening feature set established for the biometric feature collection device; and if a matched registration biometric feature exists in the screening feature set, identifies an identity of the to-be-identified user as an identity associated with the matched registration biometric feature.

Figure 5:
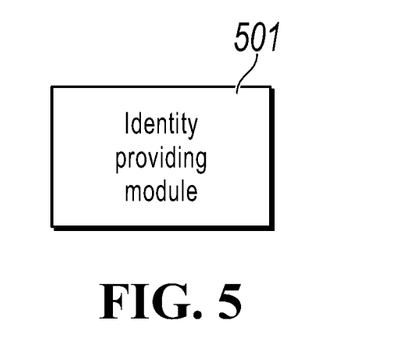
FIG. 5 is a schematic structural diagram illustrating a user mobile device, according to an implementation of the present specification.

FIG. 5 is a schematic structural diagram illustrating a user mobile device, according to an implementation of the present specification. A biometric feature collection device broadcasts a radio signal to a predetermined surrounding area of the biometric feature collection device, and the user mobile device includes an identity providing module 501, configured to: after the user mobile device enters the predetermined surrounding area, determine a group identifier of a user group to which an owner user belongs based on the received radio signal, and provide the group identifier to an identification server, so that the identification server determines a registration biometric feature associated with each user in the user group corresponding to the group identifier from a stored registration biometric feature set, and adds the determined registration biometric feature to a screening feature set established for the biometric feature collection device, where the screening feature set is used to perform biometric feature-based identification on the owner user at the biometric feature collection device.

Figure 6:
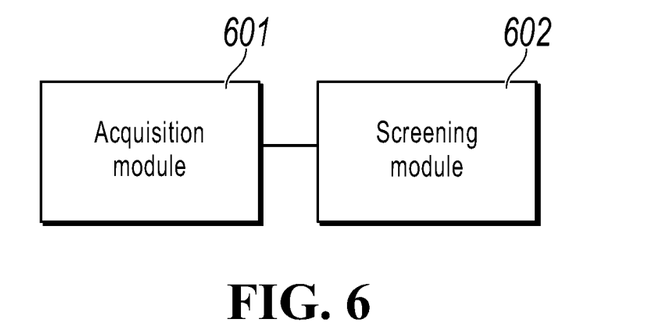
FIG. 6 is a schematic structural diagram illustrating an identification server, according to an implementation of the present specification.

FIG. 6 is a schematic structural diagram illustrating an identification server, according to an implementation of the present specification. A biometric feature collection device broadcasts a radio signal to a predetermined surrounding area of the biometric feature collection device, and the identification server device includes the following: an acquisition module 601, configured to obtain a group identifier of a user group to which an owner user belongs, where the group identifier is determined by a user mobile device based on the received radio signal and provided to the identification server after the user mobile device enters the predetermined surrounding area; and a screening module 602, configured to determine a registration biometric feature associated with each user in the user group corresponding to the group identifier from a stored registration biometric feature set, and add the determined registration biometric feature to a screening feature set established for the biometric feature collection device, where the screening feature set is used to perform biometric feature-based identification on the owner user at the biometric feature collection device.

Figure 7:
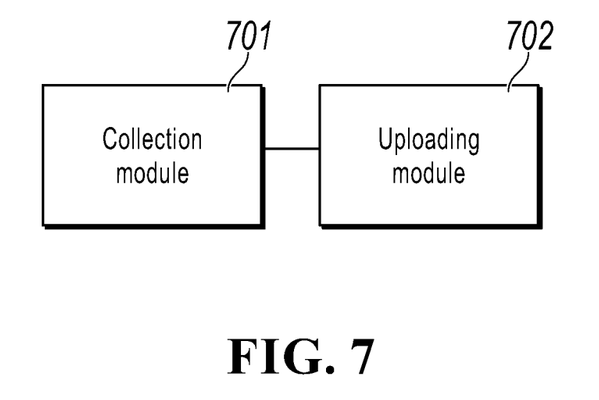
FIG. 7 is a schematic structural diagram illustrating a biometric feature collection device, according to an implementation of the present specification.

FIG. 7 is a schematic structural diagram illustrating a biometric feature collection device, according to an implementation of the present specification. The biometric feature collection device includes the following: a collection module 701, configured to collect a biometric feature of a to-be-identified user as a collection biometric feature; and an uploading module 702, configured to upload the collection biometric feature to an identification server, so that the identification server determines whether a registration biometric feature matching the collection biometric feature exists in a screening feature set established for the biometric feature collection device, and if a matched registration biometric feature exists in the screening feature set, identifies an identity of the to-be-identified user as an identity associated with the matched registration biometric feature.

Figure 8:
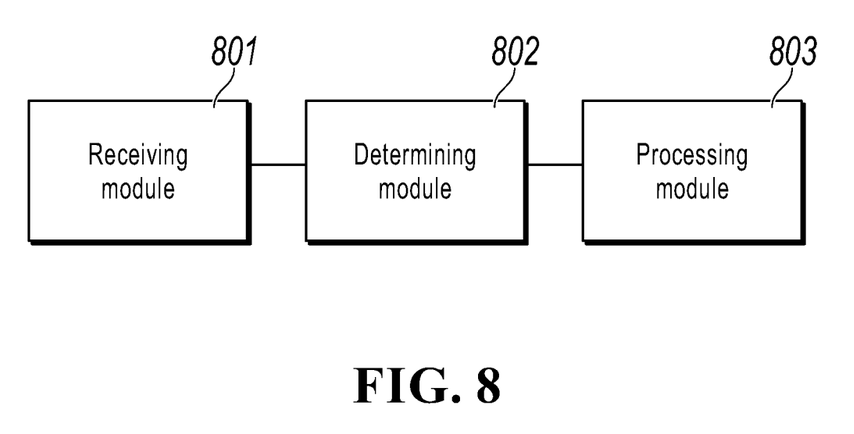
FIG. 8 is a schematic structural diagram illustrating an identification server, according to an implementation of the present specification.

FIG. 8 is a schematic structural diagram illustrating an identification server, according to an implementation of the present specification. The identification server includes the following: a receiving module 801, configured to receive a collection biometric feature uploaded by a biometric feature collection device, where the collection biometric feature is obtained by the biometric feature collection device by performing biometric feature collection on a to-be-identified user; a determining module 802, configured to determine whether a registration biometric feature matching the collection biometric feature exists in a screening feature set established for the biometric feature collection device; and a processing module 803, configured to: if a matched registration biometric feature exists in the screening feature set, identify an identity of the to-be-identified user as an identity associated with the matched registration biometric feature.

An implementation of the present specification further provides a computer device. The computer device includes at least a memory, a processor, and a computer program that is stored in the memory and can run on the processor, and the processor implements the method shown in FIG. 1 or FIG. 3 when executing the program.

Figure 9:
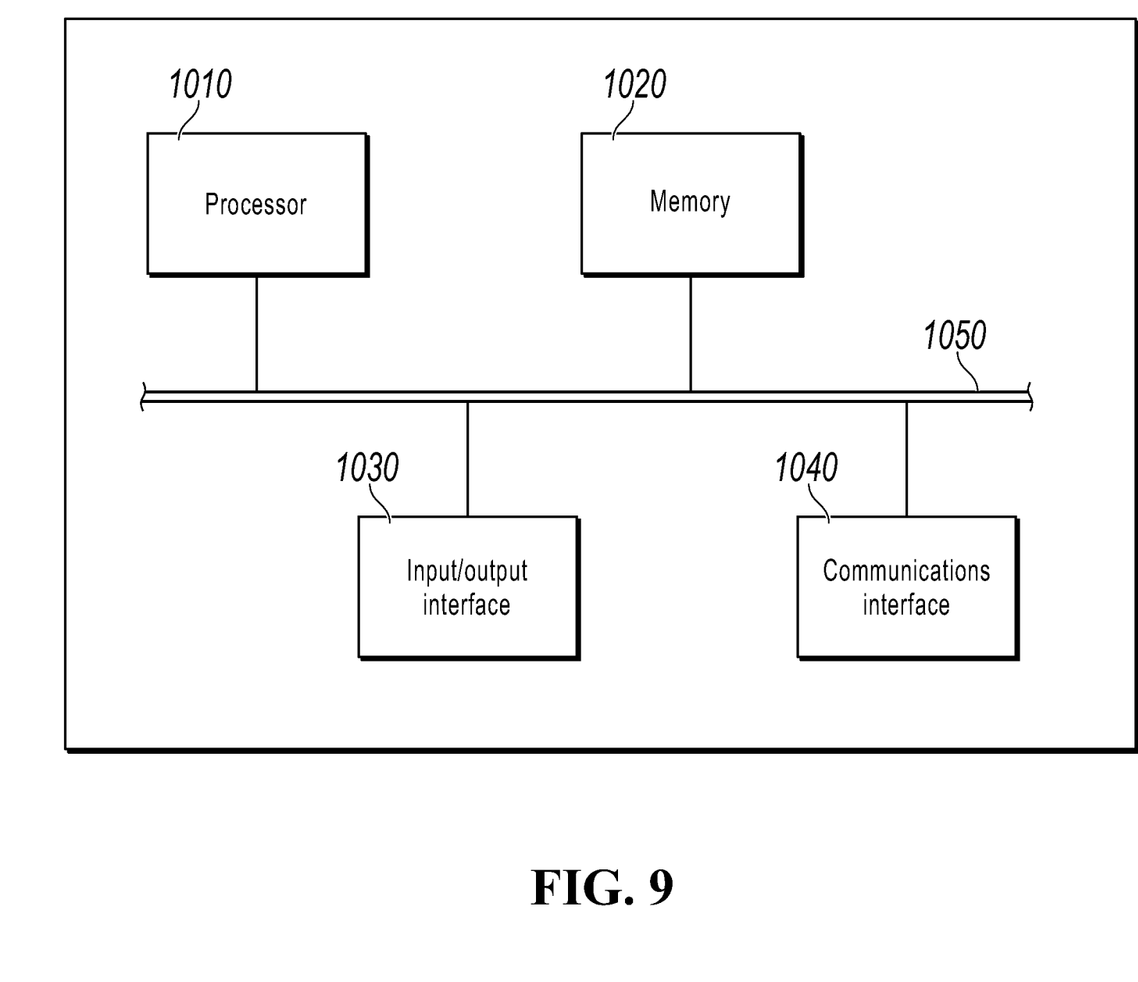
FIG. 9 is a schematic structural diagram of a device for configuring the method in the implementations of the present specification.

FIG. 9 is a more detailed schematic diagram illustrating a hardware structure of a computing device, according to an implementation of the present specification. The device can include a processor 1010, a memory 1020, an input/output interface 1030, a communications interface 1040, and a bus 1050. The processor 1010, the memory 1020, the input/output interface 1030, and the communications interface 1040 are communicatively connected to each other inside the device by using the bus 1050.

The processor 1010 can be implemented by using a general central processing unit (CPU), a microprocessor, an application-specific integrated circuit (ASIC), one or more integrated circuits, etc., and is configured to execute a related program, so as to implement the technical solutions provided in the implementations of the present specification.

The memory 1020 can be implemented by using a read-only memory (ROM), a random access memory (RAM), a static storage device, a dynamic storage device, etc. The memory 1020 can store an operating system and another application program. When the technical solutions provided in the implementations of the present specification are implemented by using software or firmware, related program code is stored in the memory 1020, and is invoked and executed by the processor 1010.

The input/output interface 1030 is configured to be connected to an input/output module, to input or output information. The input/output module (not shown in the figure) can be used as a component and configured in the device, or can be externally connected to the device, to provide a corresponding function. The input module can include a keyboard, a mouse cursor, a touchscreen, a microphone, various sensors, etc. The output module can include a monitor, a speaker, an oscillator, an indicator, etc.

The communications interface 1040 is configured to be connected to a communications module (not shown in the figure), to implement communication interaction between the device and another device. The communications module can perform over wired communication (e.g., through a USB or a network cable), or can perform communication wirelessly (e.g., through a mobile network, Wi-Fi, or Bluetooth).

The bus 1050 includes a channel, used to transmit information between components (e.g., the processor 1010, the memory 1020, the input/output interface 1030, and the communications interface 1040) of the device.

It is worthwhile to note that although only the processor 1010, the memory 1020, the input/output interface 1030, the communications interface 1040, and the bus 1050 of the device are shown, during implementation, the device can further include other components needed for implementing normal running. In addition, a person skilled in the art can understand that the device can include only components necessary for implementing the solutions in the implementations of the present specification, but does not necessarily include all components shown in the figure.

An implementation of the present specification further provides a computer-readable storage medium. The computer-readable storage medium stores a computer program, and the program is executed by a processor to implement the method shown in FIG. 1 or FIG. 3.

The computer-readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present specification, the computer-readable medium does not include computer-readable transitory media such as a modulated data signal and a carrier.

It can be seen from the previous descriptions of the implementations that, a person skilled in the art can clearly understand that the implementations of the present specification can be implemented by using software and a necessary general hardware platform. Based on such an understanding, the technical solutions in the implementations of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to perform the method described in the implementations of the present specification or in some parts of the implementations of the present specification.

The system, method, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

The implementations in the present specification are described in a progressive way. For same or similar parts of the implementations, references can be made to the implementations mutually. Each implementation focuses on a difference from other implementations. Particularly, a device implementation is similar to a method implementation, and therefore is described briefly. For a related part, references can be made to some descriptions in the method implementation. The previously described method implementations are merely examples. The modules described as separate parts can or cannot be physically separate. During implementation of the solutions in the implementations of the present specification, functions of the modules can be implemented in one or more pieces of software and/or hardware. Some or all of the modules can be selected based on actual needs to implement the solutions of the implementations. A person of ordinary skill in the art can understand and implement the implementations of the present specification without creative efforts.

The previous descriptions are merely specific implementations of the implementations of the present specification. It is worthwhile to note that a person of ordinary skill in the art can further make several improvements or polishing without departing from the principle of the implementations of the present specification, and the improvements or polishing shall fall within the protection scope of the implementations of the present specification.

What is claimed is:

1. A computer-implemented method, comprising:
   receiving at an identification server, and from a mobile computing device that has entered a predetermined area surrounding a biometric feature collection device, a group identifier of a first user group to which a first user of the mobile computing device belongs, wherein the group identifier is transmitted by the mobile computing device in response to the mobile computing device receiving a radio signal broadcast to the predetermined area, and wherein the first user group is one of a plurality of user groups;
   based on the group identifier, selecting, by the identification server and from a stored registration biometric feature set, a registration biometric feature associated with each user in the first user group; and
   adding, by the identification server, the registration biometric feature to a screening feature set established for the biometric feature collection device; and
   performing biometric feature-based identification on the user using the screening feature set.

2. The computer-implemented method of claim 1, wherein:
   the first user group comprises a single user, and
   the group identifier identifies the single user in the first user group.

3. The computer-implemented method of claim 1, further comprising classifying a plurality of users into the plurality of user groups, wherein classifying the plurality of users comprises:
   determining, for each user of the plurality of users, a corresponding group identifier to which an identity of the user is mapped based on a predetermined identity-group identifier mapping algorithm, and
   classifying the user into a user group based on the corresponding group identifier to which the identity of the user is mapped.

4. The computer-implemented method of claim 1, wherein adding, by the identification server, the registration biometric feature to the screening feature set comprises:
   determining, by the identification server, that the registration biometric feature satisfies a specified condition and adding the registration biometric feature to the screening feature set in response to determining that the registration biometric feature satisfies the specified condition, wherein the specified condition is that a registration activity area of first user is in a location area in which the biometric feature collection device is located.

5. The computer-implemented method of claim 1, further comprising deleting, by the identification server, a particular registration biometric feature from the screening feature set after a specified duration elapses from a time when the particular registration biometric feature was added to the screening feature set.

6. The computer-implemented method of claim 1, further comprising:
   receiving, by the identification server and from the biometric feature collection device, a biometric feature of a to-be-identified user as a collection biometric feature;
   determining, by the identification server, that the screening feature set established for the biometric feature collection device comprises a registration biometric feature that matches the collection biometric feature; and
   in response to determining that the screening feature set established for the biometric feature collection device comprises the registration biometric feature that matches the collection biometric features, identifying, as an identity of the to-be-identified user, an identity associated with the registration biometric feature that matches the collection biometric feature.

7. The computer-implemented method of claim 1, further comprising:
   receiving, by the identification server and from the biometric feature collection device, a biometric feature of a to-be-identified user as a collection biometric feature;
   determining, by the identification server, that the screening feature set established for the biometric feature collection device does not include a registration biometric feature that matches the collection biometric feature;
   in response to determining that the screening feature set established for the biometric feature collection device does not include a registration biometric feature that matches the collection biometric feature, determining, by the identification server, a stored registration biometric feature set comprises a registration biometric feature that matches the collection biometric feature;
   whenever the stored registration biometric feature set comprises a registration biometric feature that matches the collection biometric feature, identifying, as an identity of the to-be-identified user, an identity associated with the registration biometric feature that matches the collection biometric feature; and
   whenever the stored registration biometric feature set does not include a registration biometric feature that matches the collection biometric feature, determining, by the identification server, that identification of the to-be-identifier user fails.

8. A non-transitory, computer-readable medium storing one or more instructions executable by a computer system to perform operations comprising:
   receiving at an identification server, and from a mobile computing device that has entered a predetermined area surrounding a biometric feature collection device, a group identifier of a first user group to which a first user of the mobile computing device belongs, wherein the group identifier is transmitted by the mobile computing device in response to the mobile computing device receiving a radio signal broadcast to the predetermined area, and wherein the first user group is one of a plurality of user groups;
based on the group identifier, selecting, by the identification server and from a stored registration biometric feature set, a registration biometric feature associated with each user in the first user group; and
adding, by the identification server, the registration biometric feature to a screening feature set established for the biometric feature collection device; and
performing biometric feature-based identification on the user using the screening feature set.

9. The non-transitory, computer-readable medium of claim 8, wherein:
the first user group comprises a single user, and
the group identifier identifies the single user in the first user group.

10. The non-transitory, computer-readable medium of claim 8, wherein the operations comprise classifying a plurality of users into the plurality of user groups, wherein classifying the plurality of users comprises:
determining, for each user of the plurality of users, a corresponding group identifier to which an identity of the user is mapped based on a predetermined identity-group identifier mapping algorithm, and
classifying the user into a user group based on the corresponding group identifier to which the identity of the user is mapped.

11. The non-transitory, computer-readable medium of claim 8, wherein adding, by the identification server, the registration biometric feature to the screening feature set comprises:
determining, by the identification server, that the registration biometric feature satisfies a specified condition and adding the registration biometric feature to the screening feature set in response to determining that the registration biometric feature satisfies the specified condition, wherein the specified condition is that a registration activity area of first user is in a location area in which the biometric feature collection device is located.

12. The non-transitory, computer-readable medium of claim 8, wherein the operations comprise deleting, by the identification server, a particular registration biometric feature from the screening feature set after a specified duration elapses from a time when the particular registration biometric feature was added to the screening feature set.

13. The non-transitory, computer-readable medium of claim 8, wherein the operations comprise:
receiving, by the identification server and from the biometric feature collection device, a biometric feature of a to-be-identified user as a collection biometric feature;
determining, by the identification server, that the screening feature set established for the biometric feature collection device comprises a registration biometric feature that matches the collection biometric feature; and
in response to determining that the screening feature set established for the biometric feature collection device comprises the registration biometric feature that matches the collection biometric features, identifying, as an identity of the to-be-identified user, an identity associated with the registration biometric feature that matches the collection biometric feature.

14. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving at an identification server, and from a mobile computing device that has entered a predetermined area surrounding a biometric feature collection device, a group identifier of a first user group to which a first user of the mobile computing device belongs, wherein the group identifier is transmitted by the mobile computing device in response to the mobile computing device receiving a radio signal broadcast to the predetermined area, and wherein the first user group is one of a plurality of user groups;
based on the group identifier, selecting, by the identification server and from a stored registration biometric feature set, a registration biometric feature associated with each user in the first user group; and
adding, by the identification server, the registration biometric feature to a screening feature set established for the biometric feature collection device; and
performing biometric feature-based identification on the user using the screening feature set.

15. The computer-implemented system of claim 14, wherein:
the first user group comprises a single user, and
the group identifier identifies the single user in the first user group.

16. The computer-implemented system of claim 14, wherein the operations comprise classifying a plurality of users into the plurality of user groups, wherein classifying the plurality of users comprises:
determining, for each user of the plurality of users, a corresponding group identifier to which an identity of the user is mapped based on a predetermined identity-group identifier mapping algorithm, and
classifying the user into a user group based on the corresponding group identifier to which the identity of the user is mapped.

17. The computer-implemented system of claim 14, wherein adding, by the identification server, the registration biometric feature to the screening feature set comprises:
determining, by the identification server, that the registration biometric feature satisfies a specified condition and adding the registration biometric feature to the screening feature set in response to determining that the registration biometric feature satisfies the specified condition, wherein the specified condition is that a registration activity area of first user is in a location area in which the biometric feature collection device is located.

18. The computer-implemented system of claim 14, wherein the operations comprise deleting, by the identification server, a particular registration biometric feature from the screening feature set after a specified duration elapses from a time when the particular registration biometric feature was added to the screening feature set.

19. The computer-implemented system of claim 14, wherein the operations comprise:
receiving, by the identification server and from the biometric feature collection device, a biometric feature of a to-be-identified user as a collection biometric feature;

determining, by the identification server, that the screening feature set established for the biometric feature collection device comprises a registration biometric feature that matches the collection biometric feature; and in response to determining that the screening feature set established for the biometric feature collection device comprises the registration biometric feature that matches the collection biometric features, identifying, as an identity of the to-be-identified user, an identity associated with the registration biometric feature that matches the collection biometric feature.

20. The computer-implemented system of claim 14, wherein the operations comprise:

receiving, by the identification server and from the biometric feature collection device, a biometric feature of a to-be-identified user as a collection biometric feature;

determining, by the identification server, that the screening feature set established for the biometric feature collection device does not include a registration biometric feature that matches the collection biometric feature;

in response to determining that the screening feature set established for the biometric feature collection device does not include a registration biometric feature that matches the collection biometric feature, determining, by the identification server, a stored registration biometric feature set comprises a registration biometric feature that matches the collection biometric feature;

whenever the stored registration biometric feature set comprises a registration biometric feature that matches the collection biometric feature, identifying, as an identity of the to-be-identified user, an identity associated with the registration biometric feature that matches the collection biometric feature; and whenever the stored registration biometric feature set does not include a registration biometric feature that matches the collection biometric feature, determining, by the identification server, that identification of the to-be-identifier user fails.

\* \* \* \* \*